Sept. 20, 1949.  H. W. JONES ET AL  2,482,188
METHOD OF AND APPARATUS FOR CUTTING METAL
Original Filed Aug. 4, 1939  7 Sheets-Sheet 1
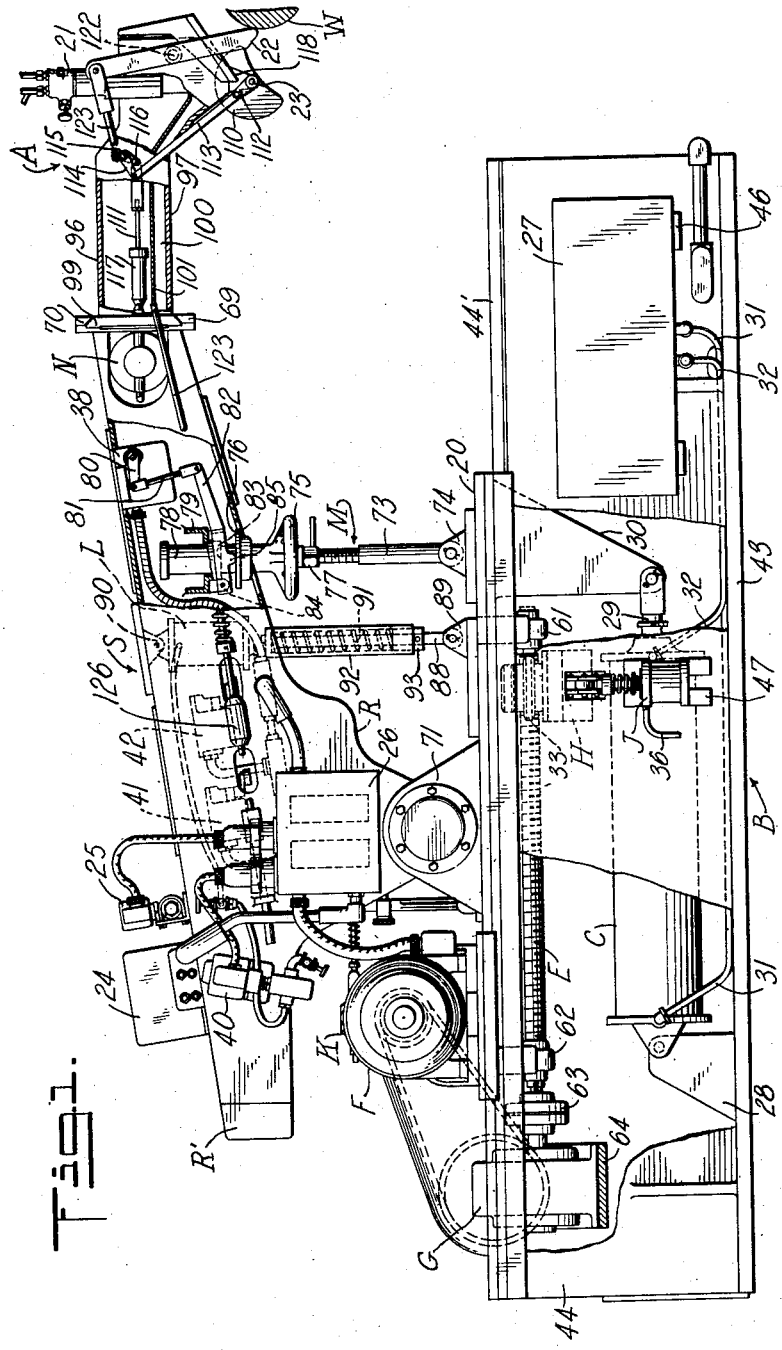
INVENTORS
JAMES H. BUCKNAM
HOMER W. JONES
BY
ATTORNEY

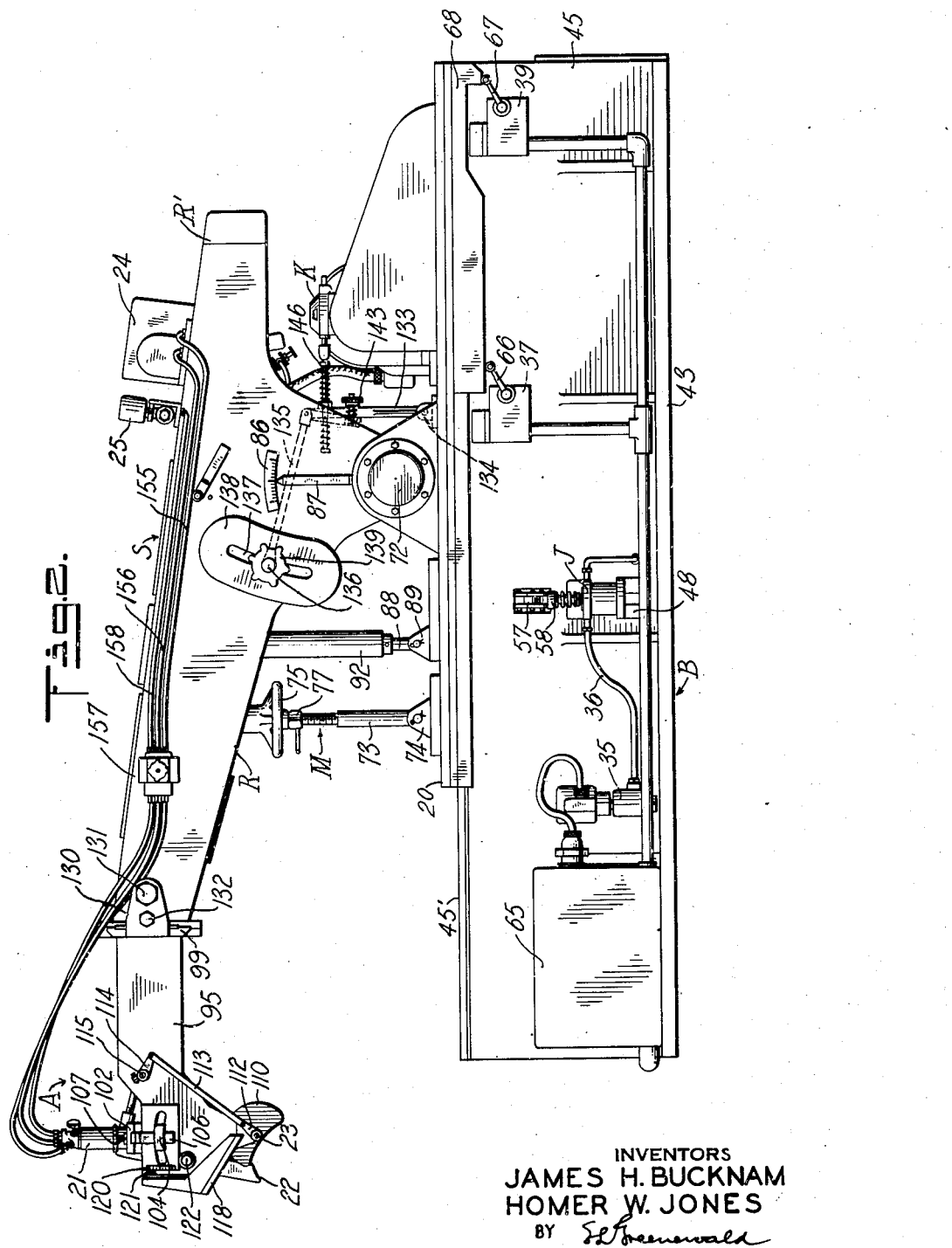

Sept. 20, 1949.   H. W. JONES ET AL   2,482,188
METHOD OF AND APPARATUS FOR CUTTING METAL
Original Filed Aug. 4, 1939   7 Sheets-Sheet 3
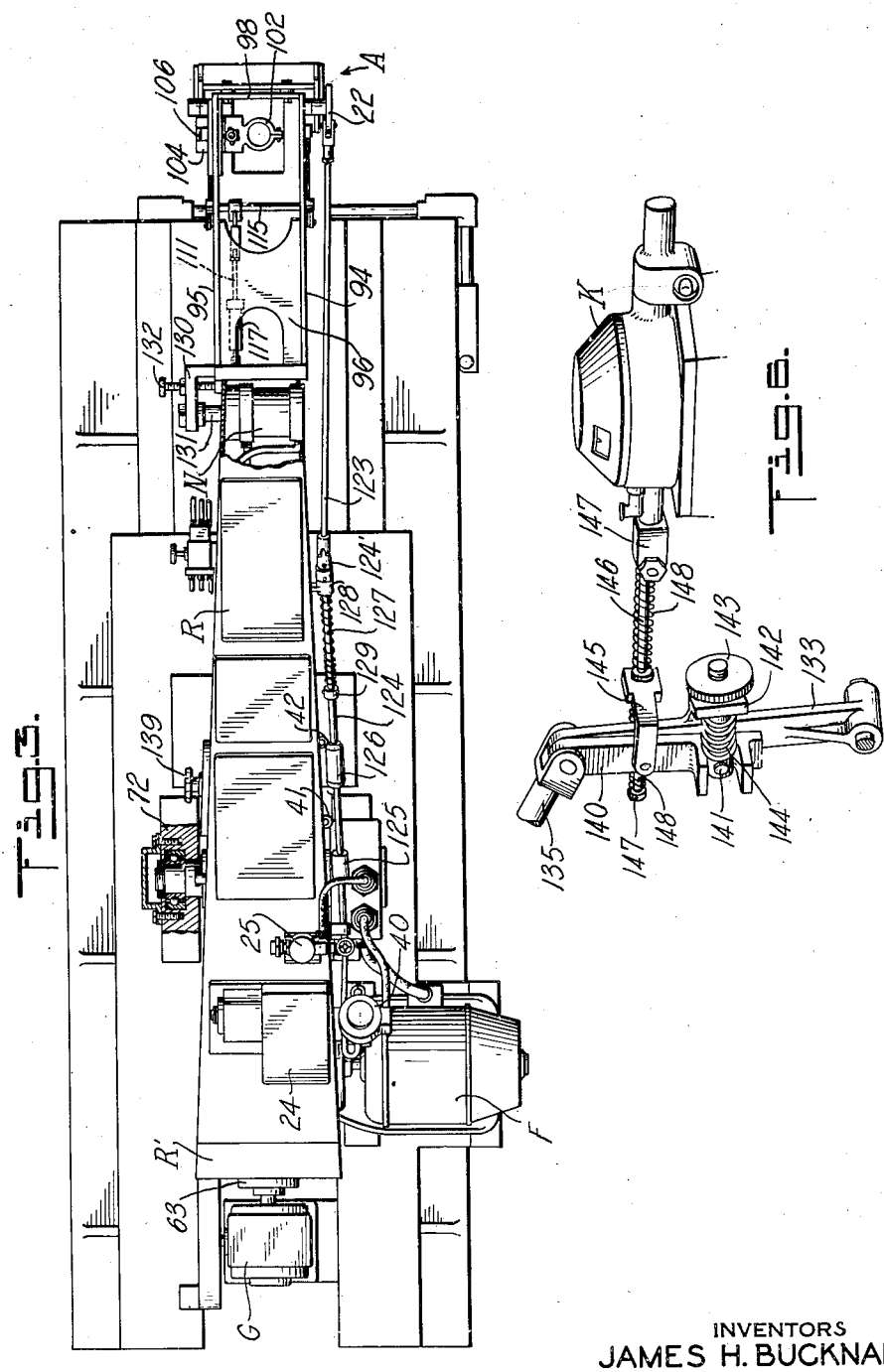
INVENTORS
JAMES H. BUCKNAM
HOMER W. JONES
BY
ATTORNEY

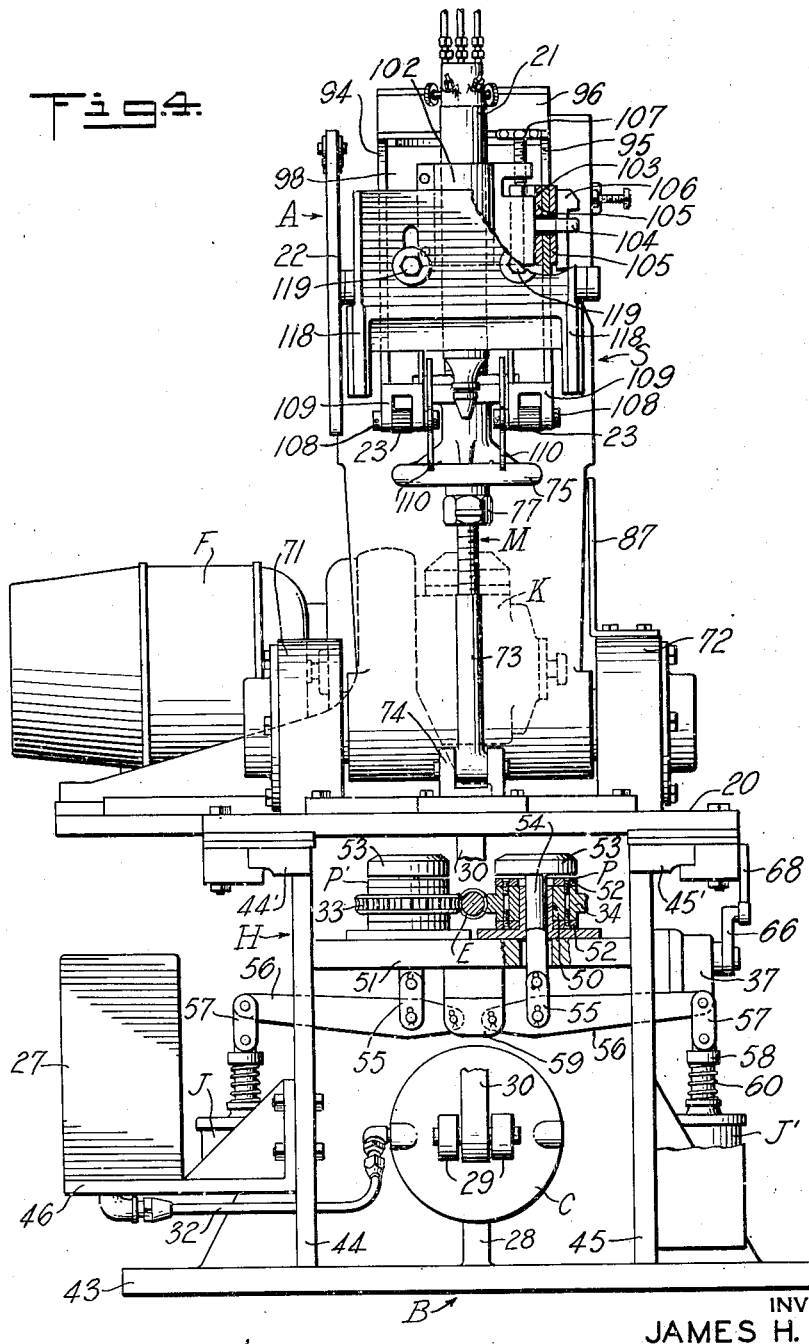

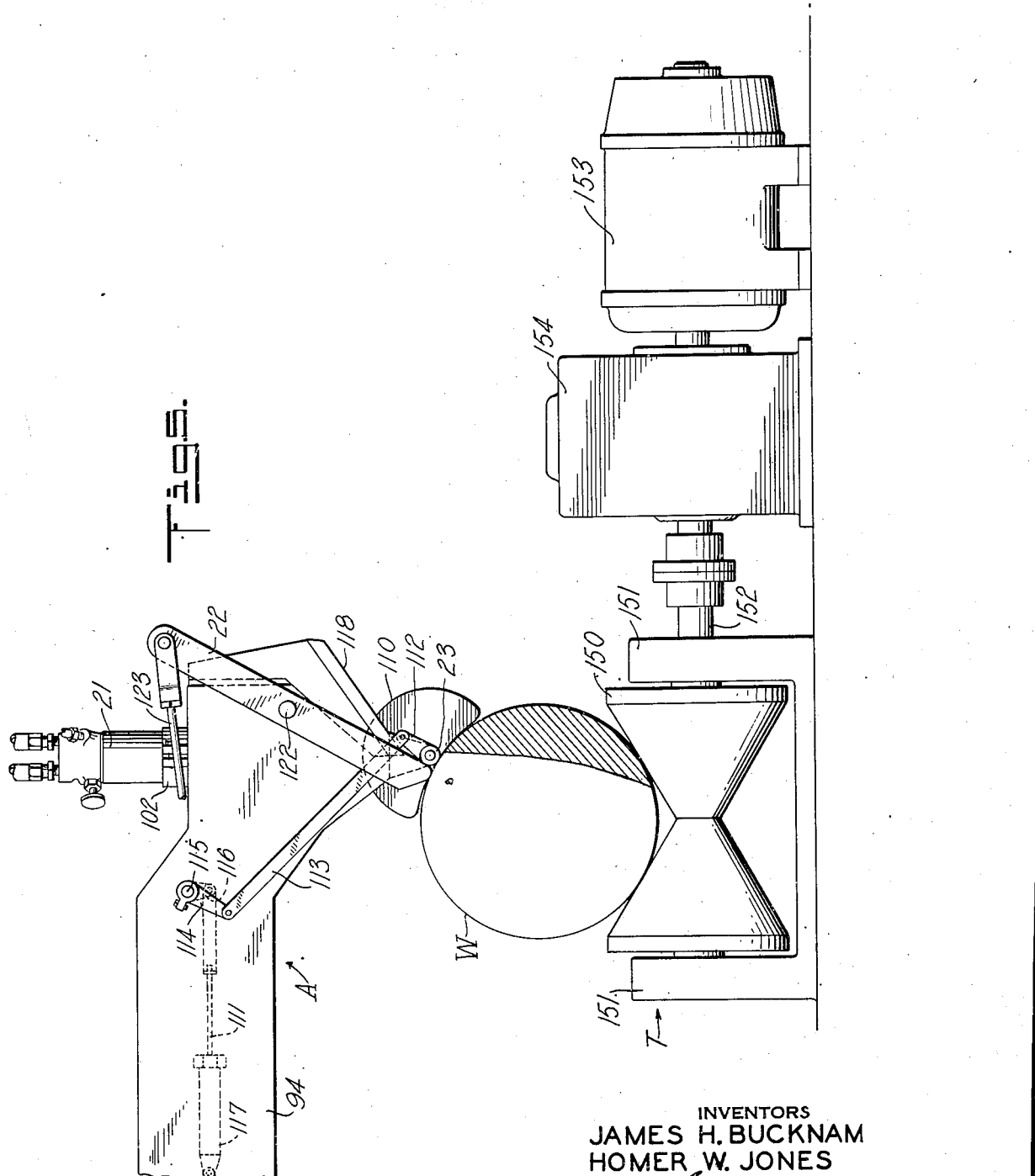

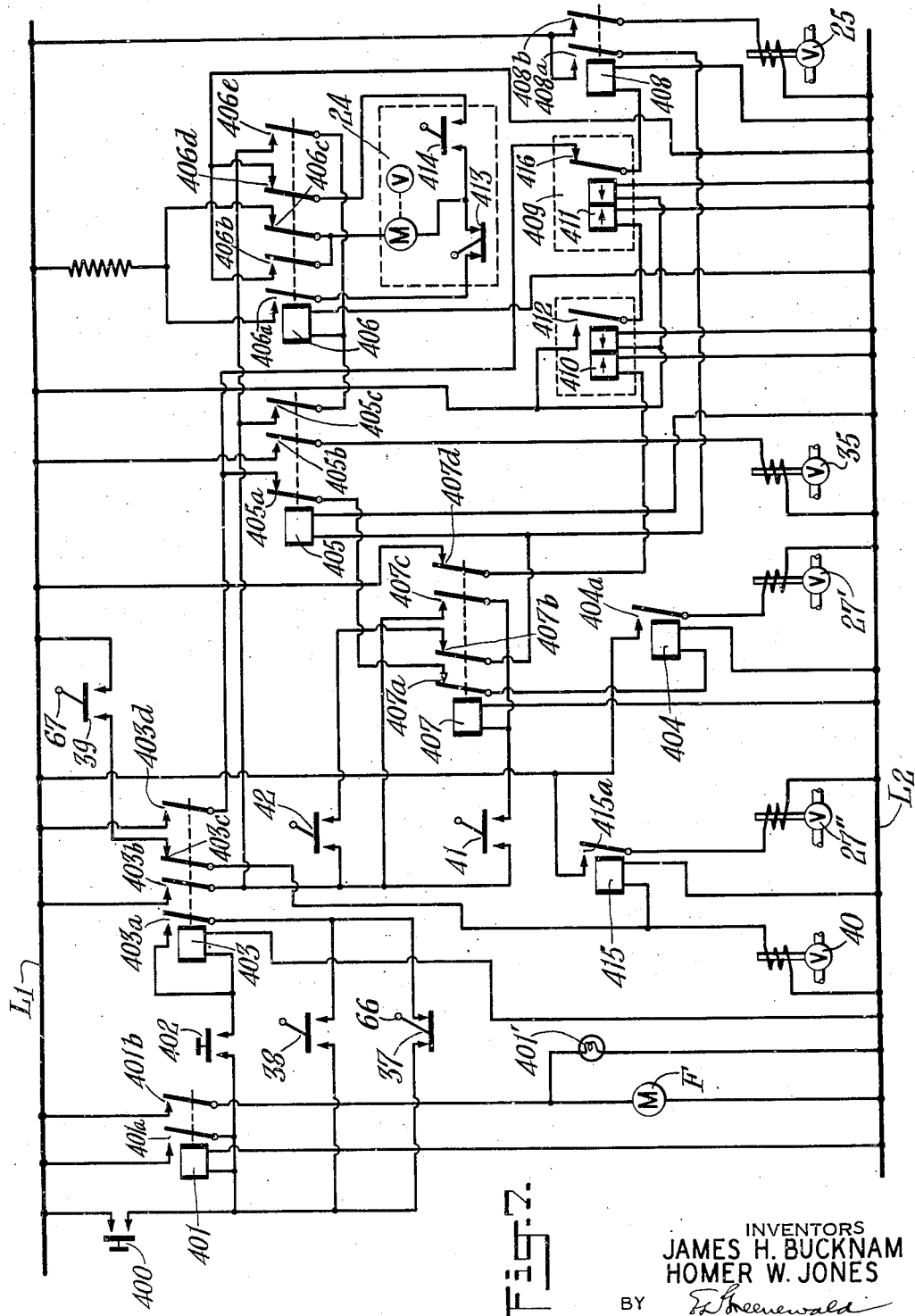

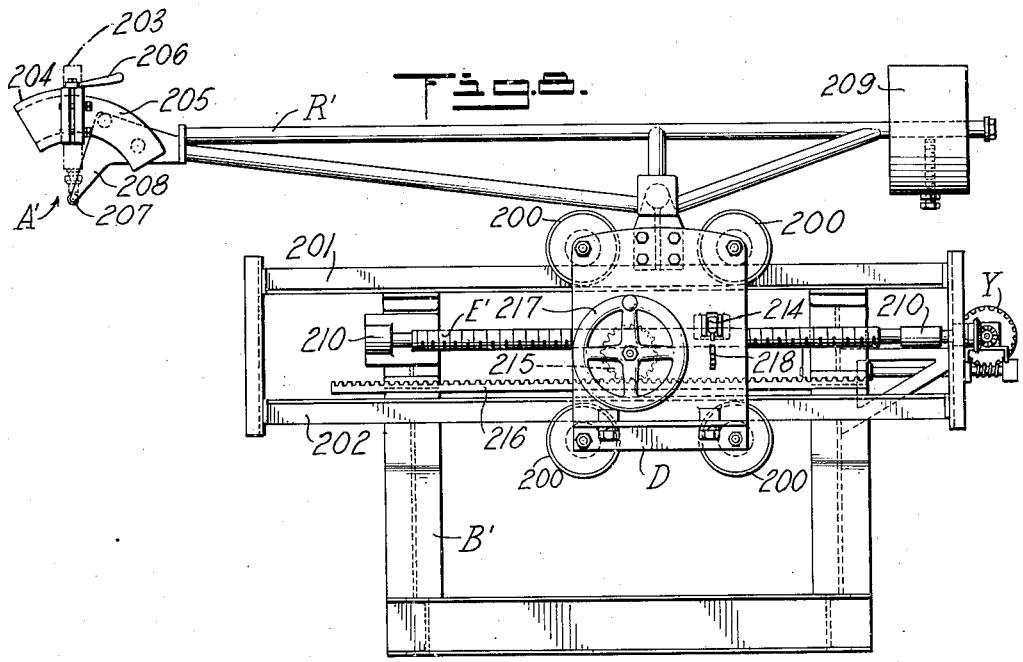
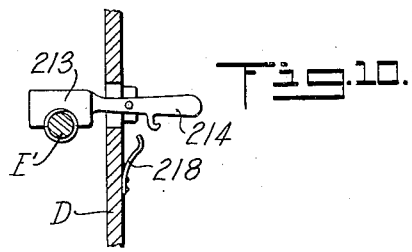
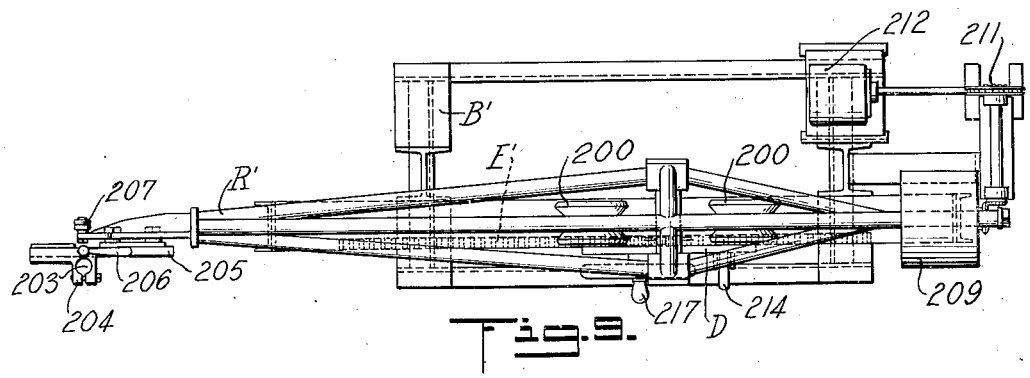
INVENTORS
JAMES H. BUCKNAM
HOMER W. JONES

Patented Sept. 20, 1949

2,482,188

UNITED STATES PATENT OFFICE 2,482,188

METHOD OF AND APPARATUS FOR CUTTING METAL

Homer W. Jones, Westfield, and James H. Bucknam, Cranford, N. J., assignors to Union Carbide and Carbon Corporation, a corporation of New York Continuation of application Serial No. 288,366, August 4, 1939. This application July 28, 1944, Serial No. 547,024

42 Claims. (Cl. 148—9.6)

This invention relates to the art of cutting metals by means of a gas-cutting tool and particularly to a method of and an apparatus automatically or semi-automatically controlled, for rapidly and efficiently cutting elongated metal stock.

This application is a continuation of our copending application Serial No. 288,366, filed August 4, 1939, now abandoned.

In cutting elongated metal stock, for example, in removing scrap ends from billets or blooms during hot working operations, or in cutting heavy rounds or other shapes to predetermined lengths, it is a customary mill practice to cut the metal while it is hot and to employ a powerful metal shear, or a metal circular saw revolving at an extremely high rate of speed. Neither of these means of cutting such stock is entirely satisfactory, particularly if the stock has a heavy cross section. In shearing operations, the shear blades are subject to excessive wear and must be frequently sharpened or replaced. Also, an objectionable projection or lip, especially pronounced on sheared stock of the high strength alloy steel compositions, may be formed on the severed face of the stock. Cutting by means of a high-speed circular saw is unsatisfactory in that the cutting edge of the saw requires frequent resharpening and rapidly deteriorates from exposure to heat when in contact with or in close proximity to hot stock. Further, due to the high rate of peripheral speed at which such a saw must be operated, there is always the danger that the saw will shatter.

Apparatus particularly adapted for cutting cold round bar stock including a gas-cutting blowpipe and means automatically or semi-automatically controlled to impart transverse motion to said blowpipe has been proposed heretofore. In general, such apparatus had a frame adapted to be clamped or otherwise supported directly on the stock, and mounted on or within the frame, a gas-cutting blowpipe which was guided in an arcuate motion across the stock.

Apparatus of the foregoing type does not provide a satisfactory means of cutting if the stock has a relatively large cross-sectional area, and especially if the stock is to be cut while hot. Such apparatus must be positioned on the stock by the operator before each cut and, consequently, while making the necessary adjustments the operator is continually subjected to the heat from the hot stock. Further difficulties in adjusting such apparatus arise when it is desired to cut stocks of different diameters or when it is desired to produce a cut having a substantially smooth, even surface.

A principal object of the present invention is to provide an improved method of thermochemically severing elongated metal stock at a rapid rate and suitable apparatus for carrying out such method. Other objects of the invention are: to provide method and apparatus for varying the angle between the successive positions of the jet, the angle variations being substantially greater during the first half of the cut and in such direction that the jet tends to sweep along the lower portion of the kerf at a faster rate than along the the upper portion of the kerf; to provide an improved apparatus including a gas-cutting tool such as a blowpipe for rapidly and efficiently transversely severing elongated metal stock which apparatus may be adjusted and controlled by the operator at a point remote from the stock; to provide an apparatus including means for causing the gas-cutting blowpipe to traverse the stock in a smooth uninterrupted motion, and to maintain the blowpipe in a suitable relation to the surface of the stock during such motion; to provide an apparatus including means for automatically starting the cutting operation, means for automatically controlling the supply of gases to the blowpipe, means, responsive to the thickness of the stock, for automatically controlling the traverse speed of the cutting blowpipe as the cutting operation progresses, and means for automatically returning the cutting blowpipe to its original position.

The manner in which these and still other objects are attained by the invention will be apparent from the following description and drawings in which:

Fig. 1 is a left-side elevational view partly in section of a preferred embodiment of the invention;

Fig. 2 is a right-side elevational view of the apparatus shown in Fig. 1;

Fig. 3 is a plan view of the apparatus shown in Fig. 1 with portions broken away;

Fig. 4 is a front end view, partly in section, of the apparatus showing details of the clutch operating mechanism;

Fig. 5 is an enlarged fragmentary view showing the relation of the blowpipe head and work before the completion of a cut;

Fig. 6 is an enlarged fragmentary detail view of the motor-speed control mechanism of Fig. 2;

Fig. 7 is a schematic wiring diagram of the control mechanism employed in the embodiment of the invention shown in Fig. 1;

Fig. 8 is a side elevational view of another embodiment of the invention;

Fig. 9 is a plan view of the apparatus shown in Fig. 8; and

Fig. 10 is a fragmentary detail view of the half-nut clutch employed in the embodiment of Fig. 9.

In accordance with the preferred embodiment of the present invention, a gas-cutting blowpipe is supported by a frame which extends transversely of the stock to be cut. Means which operate in automatically controlled sequence are provided to impart a transverse motion to said frame so that, during the cutting operation, the blowpipe is caused to traverse the stock in a smooth, uninterrupted motion, the blowpipe being maintained at a substantially constant distance from the surface and at a predetermined suitable angular relation to the work. Automatic means are provided to supply the preheat gases and the oxidizing gas to the blowpipe at predetermined points in its travel and to interrupt such supply at the completion of the cut. Automatic means are provided to reduce the traverse speed of the cutting blowpipe as the thickness of the stock increases during the cutting operation. At the completion of the cut, the blowpipe is automatically raised and the frame caused to retract to its original position.

Although the present invention is particularly adapted to the cutting of solid elongated metal stock of round cross section, and will be described with respect to that particular application, other shapes such as bars of square and polygonal cross section as well as bars of rectangular cross section can be cut by the apparatus or by similar apparatus constructed according to the principles of the invention.

Referring to Figs. 1 to 6, inclusive, the particular embodiment of the invention shown comprises a lower frame or base B and an upper frame S movable longitudinally with respect to the base B. The base B may be fixed to the mill floor or may be provided with flanged rollers and mounted on a suitable track so that the entire apparatus may be quickly transported from one location to the other.

The upper frame S comprises a large rocker arm or boom R pivotally mounted on a horizontal plate or carriage 20 at approximately the center of said plate and supported in an operating position by an adjustable handscrew mechanism M between the boom and the forward portion of the plate. The plate 20 is slidably mounted on the base B; consequently, any motion imparted to the plate 20 will likewise be imparted to the entire upper frame S including the boom R.

The boom R supports at its forward extremity a water-cooled cutting head A comprising an oxy-acetylene cutting blowpipe 21, a limit lever 22, and means including rollers 23 for guiding said blowpipe in its travel across the work. The cutting head A is capable of a slight lateral movement with respect to the boom R so that it is not necessary to move either the work or the entire apparatus if, for some reason, a cut has been started but not completed and it is desired to start a new cut adjacent to the previous one. The blowpipe 21 is connected to a source of preheating gases through a motor-operated valve 24 and to a source of cutting oxygen through a solenoid operated valve 25. To provide a delayed flow of the cutting oxygen to the blowpipe after the combustible or preheat gases have been ignited, and to delay the forward travel of the blowpipe 21 a sufficient period to permit a surface portion of the edge of the stock to be preheated to an ignition temperature, a time delay rheostat connected with suitable terminal strips in housing 26 is preferably interposed in the electrical control circuit.

The longitudinal motion of the upper frame S to a point where the blowpipe 21 is about 3″ from the stock is provided by an air-operated power cylinder C, a clutch hereinafter described is then engaged to bring the blowpipe into preheat position. The air-operated power cylinder C is mounted within the base B and controlled by a multiple air valve 27 which consists of a solenoid valve 27′ for controlling the forward motion of the frame S, and a solenoid valve 27″ for controlling the retraction of the frame S. The cylinder C is pivotally secured to a bracket 28 extending upwardly from the bottom of the base B and has a movable piston rod 29 pivoted to a bracket 30 depending downwardly from the forward portion of the plate 20. The head and rod ends of the cylinder C are connected with the multiple valve 27 by conduits 31 and 32, respectively. The forward travel of the blowpipe 21 over the work after a preheat to an ignition temperature has been obtained is provided by suitable engagement of mechanism H in the base B hereinafter described, with a threaded drive shaft or screw E carried by the plate 20 which shaft continually revolves during the operating cycle of the apparatus. The threaded drive shaft E is actuated by an electric motor F through gearing including a suitable speed reduction unit G and imparts forward motion to the plate 20 through the clutch mechanism H (Fig. 4) which comprises worm gears 33 and 34 and which is actuated by air-operated cylinders J and J′ vertically mounted one on each side of the base B. The flow of air to the cylinders J and J′ is controlled by a solenoid operated valve 35 connected thereto by conduits 36. The speed of the motor F is automatically regulated by speed-governing means such as a motor-control unit K hereinafter described and in such a manner that the speed of transverse movement of the blowpipe 21 over the work is, when cutting round stock, greatest at the beginning and end of the cut, and least at the center of the cut.

The return movement of the upper frame S after the completion of the cut is controlled by limit switches 37, 38, and 39 (Figs. 1 and 2), and by an air-operated cylinder L which is mounted on the boom R and which raises the cutting head A a sufficient distance to clear the work. The flow of air to the cylinder L is controlled by a solenoid valve 40 mounted on the boom R. Also mounted on or within the boom are limit switches 41 and 42, an air cylinder N which controls the slight transverse movement of the cutting head A, and terminal panel housing 26.

The starting and stopping push buttons, relays and contactors controlling the operation of the several solenoid valves, and the time delay rheostat may be mounted on a control panel (not shown) adjacent to the apparatus.

The several parts of the particular embodiment of the cutting apparatus shown in Figs. 1 to 6, will now be described in greater detail.

Referring to Figs. 1 and 4, the base B comprises a rectangular frame consisting of a bottom member 43 and side members 44 and 45 rigidly mounted and braced on the bottom member 43. Extending longitudinally along the top of each of the side members 44 and 45 are tracks or ways 44′ and 45′, respectively, adapted to slidably engage the edges of the plate 20 upon which the upper frame S of the apparatus is mounted. The bracket 28 is rigidly fixed to the bottom member 43 of the base B. The multiple valve 27 which controls the flow of air to the air cylinder C, through conduits 31 and 32, is mounted on a bracket 46 which is fixed to the side member 44 of the base B. Brackets 47 and 48 (Figs. 1 and 2) are secured to the side members 44 and 45 for supporting air cylinders J and J', respectively.

The clutch mechanism H which is shown in detail in Fig. 4 and which serves to impart a forward motion at suitable cutting speed to the plate 20 by the rotation of the threaded drive shaft or screw E comprises right-hand and left-hand clutch units P and P', respectively, the actions of which are simultaneous. The construction and operation of both units are the same. Accordingly, only a description of the right-hand clut unit P will be given.

The clutch unit P comprises the worm gear 34 adapted to mesh with the threaded drive shaft E and journalled on a vertical hollow shaft 50. The shaft 50 is bored axially and is rigidly fixed to a cross member 51 of the base B which is provided with an opening corresponding to the opening in the shaft 50. The upper and lower surfaces of the worm gear 34 are faced with friction plates 52. A clutch plate 53 is arranged to press down on the upper friction plate 52 and has a stem 54 which is vertically slidable in the shaft 50, extends through the opening in the cross member 51, and is pivotally attached at its lower extremity by a link 55 to a lever 56. One arm of the lever 56 extends through the side wall 45 and is pivotally attached by a second link 57 to the piston rod 58 of air cylinder J'. The other end of the lever 56 is fulcrumed on a projection 59 rigidly fixed to the bottom of the cross member 51. A spring 60 is interposed between the end of the piston rod 58 and the housing of the air cylinder J'. As previously mentioned, the threaded drive shaft E is mounted on the plate 20 and moves therewith. During operation of the apparatus the threaded drive shaft E rotates continually and being constantly meshed with both worm gears 33 and 34 causes said gears to rotate. From the drawing and description of the clutch unit H, it will be apparent that entrance of air under pressure into the cylinders J and J' will cause a downward movement of the piston rods 58 which movement will, in turn, be transmitted to the plates 53 with sufficient force to stop the rotation of the worm gears 33 and 34. Stopping the rotation of said worm gears causes them to act as a stationary nut meshing with the revolving shaft E and thus impart a forward motion to the plate 20.

The shaft E is, with the exception of journal portions adjacent to each end, threaded the entire length. Bearings 61 and 62, secured to the bottom of the plate 20, support the threaded drive shaft E at each journal portion. Rotation of the drive shaft is effected through the reduction gear unit G coupled to the shaft by a coupling 63. A bracket 64 rigidly attached to and depending from the plate 20 supports the reduction gear unit G.

Also mounted on one side 45 of the base B are the limit switches 37 and 39, the solenoid valve 35 controlling the flow of air to air cylinders J and J', and a terminal box 65. The limit switches 37 and 39 are positioned so that their operating arms 66 and 67 will engage the surfaces of a cam 68 secured to the under side of the plate 20.

The upper frame S includes the hollow boom R and cutting head A slidably mounted in horizontal ways 69 and 70 on the forward extremity of boom R. The boom R is pivoted to ears 71 and 72 which project from the top of the plate 20, and is supported in an operating position by means of the handscrew mechanism M.

The handscrew mechanism M comprises a vertical pillar 73 threaded along a portion of its upper length and pivotally attached at its lower extremity to a clevis 74 which is secured to the plate 20. A handwheel 75 provided with a flat upper surface 76 is threadedly mounted on the pillar 73 and locked in position by means of a lever-operated jam nut 77. The handwheel 75 is also provided with a hollow cylindrical portion 78 that extends upwardly from the face 76 and extends through an opening in a transverse bracket 79 secured to the side walls of the boom R. To operate the limit switch 38 as the cutting head A is moved up, and over the bar W, the arm 80 of the switch is connected through linkage 81 to the end of a lever arm 82 secured to a fork 83 which surrounds the lower portion of bracket 79 and is pivotally attached to an ear 84 on the bracket 79. The fork 83 is provided with a pair of diametrically opposed contact shoes 85 which engage the upper surface 76 of the handwheel 75. The boom is normally supported by engagement of the bracket 79 with the face 76, the position of the boom being adjustable by changing the vertical position of the handwheel 75 with respect to the pillar 73 which will raise or lower the boom R and thus provide a suitable vertical adjustment of the cutting head A. As the boom lifts during the cutting operation the linkage 81 moves downward and operates the switch 38, and as the boom lowers to its original position with the bracket 79 contacting the top face 76 of the handwheel 75, the shoes 85 again operate the switch 38. A protractor scale 86 (Fig. 2) may be attached to the side of the boom R and a pointer 87 may be attached to the ear 72 so that vertical adjustment of the boom R with respect to stocks of different diameters may be quickly obtained.

To raise the cutting head A a sufficient distance to clear the work and to maintain it in that position until the boom R has retracted to its original adjusted position, the piston rod 88 of the air cylinder L is pivotally attached at 89 to the plate 20 and the head end of the cylinder is pivotally secured to a lug 90 fixed to the top of the boom R. A spring 91 surrounding the piston rod 88 and contained in a housing 92 is supported on a stop 93 and serves to take up the shock of an abrupt drop of the boom R. To balance the rocker arm R, a suitable counterweight R' may be placed at the rear of said rocker arm.

The cutting head A (shown in detail in Figs. 1 to 5) comprises side members 94 and 95, top and bottom members 96 and 97, respectively, and end members 98 and 99. The end member 99 is adapted to slidably engage the ways 69 and 70 on the boom R to provide lateral adjustment of the entire cutting head A. A chamber 100 for cooling water is provided in the cutting head A between the bottom member 97 and a partition 101 and extending forwardly to the end member 98.

The cutting blowpipe 21, which may be of a standard water-cooled type, is supported in the cutting head A by a blowpipe holder 102 (Fig. 4), which is vertically slidably secured on a member 103 provided with a slotted tongue 104 that extends through a pair of plates 105 secured one on each side of the side member 95 of the cutting head A, and directly opposite each other, the tongue 104 being held in position by a key or wedge 106. A handscrew 107 threadedly mounted in the blowpipe holder 102 and bearing against the top of the member 103 permits a slight vertical adjustment of the blowpipe holder 102 and the blowpipe thereon. The angular position of the blowpipe 21, with respect to the work, may be adjusted by loosening the wedge 106 and turning the blowpipe holder 102 to any desired angular position.

To maintain the nozzle of the blowpipe 21 at a predetermined distance from the work and to guide the cutting head A in its travel across the work, the knurled rollers 23 are rotatably mounted on the two shafts 108 which are in turn rotatably carried in two forks 109 extending downwardly from each side of the bottom member 97. Rigidly mounted on the shafts 108 are also two shields 110 which confine the heat of the blowpipe gases during the cutting operation. In order that the shields 110 will follow the position of the cutting-blowpipe jet as it moves across the work, each shaft 108 is connected through linkage to a spring plunger 111. Such linkage (Fig. 5) is the same for both shields 110 and consists of a crank 112 rigidly fixed to shaft 108 and pivotally attached to a connecting rod 113 which is in turn pivotally attached to the arm 114 of a bell crank rigidly secured to the end of a transverse shaft 115 extending through the cutting head A. The other arm 116 of the bell crank is pivotally attached to the spring plunger 111 which is continually under tension provided by a spring (not shown) contained in a spring housing 117 pivotally attached at one end to the end member 99 of the cutting head A. From the above description it is apparent that the motion of head A over the peripheral surface contour of the bar W, will cause the shields 110 to also follow around the bar W, and that the shields will, at the completion of the cut and when the boom R retracts, be returned to their original position by the force of the spring within housing 117. A skid 118 provided with vertical slots which permit vertical adjustment of said skid is fastened through the slots to the front-end member 98 by studs 119. The skid protects the forward end of the cutting head A and helps to position the blowpipe 21 at the start of the cut. A scale 120 and pointer 121 (Fig. 2) are fastened to the plate 105 and skid 118, respectively, and serve to determine quickly the position of the skid for different diameter stocks.

The limit lever 22 is pivotally mounted on a transverse shaft 122 at a point intermediate the extremities of said lever. The top end of said lever is pivotally attached to a rod 123 (Fig. 3) which extends along the side of the cutting head A and the boom R and which is connected to a second rod 124 through a universal joint 124' (Fig. 3). The rod 124 is slidably mounted on the side of the boom R and supports cams 125 and 126 which actuate the limit switches 41 and 42, respectively, mounted on the side of the boom R. A spring 127 surrounds the forward portion of the rod 124 between a support 128 and a collar 129 on the rod so that the rods are always urged backwardly.

To impart a slight lateral motion to the cutting head A, if for some reason it becomes necessary to start a new cut rather than to attempt to complete the one originally started or to adjust the lateral position of the cutting head, a bracket 130 (Fig. 3) is rigidly attached to one side of the end member 99 and to the piston rod 131 of the air cylinder N which is mounted transversely in the boom so that any motion of its piston rod 131 caused by air entering the cylinder will be imparted to the bracket 130 and the cutting head A. A screw 132 threadedly mounted in the bracket 130 serves as an adjustable stop.

The control mechanism which regulates the speed of the motor F and the threaded drive shaft E, so that the blowpipe 21 is caused to traverse the bar W at a slower rate of speed as it approaches the vertical axis of said bar and to resume its speed after the blowpipe 21 has passed the vertical axis, comprises a variable speed transmission unit K preferably of the type known as "Transitorq" with mechanism for actuating said unit. Such mechanism (Figs. 2 and 6) may comprise a vertical member 133 pivotally mounted at its lower extremity to a clevis 134 on the plate 20 and hinged at its upper extremity to one end of a rod 135. The other end of the rod 135 is pivotally secured to the head of a screw 136 which is in turn adjustably mounted in a slot 137 in a plate 138 secured to the side of the boom and may be securely held at any position in said plate by means of a handnut 139. Referring to Fig. 2, it can be seen that as the forward end of the boom R is raised, the vertical member 133 will be tilted back and as the boom R is lowered, the vertical member 133 will be tilted forward again. A member 140 provided at its lower portion with a pair of ears forming a U channel on one side away from member 133 is also pivotally mounted at its upper end to the upper end of the vertical member 133 and depends downward along one side of said vertical member. A rod 141, one end of which is pivotally mounted in the U-channel of the member 140 is threaded on its other end and projects through an opening in a bracket 142 which is rigidly fastened to the vertical member 133. A knurled handnut 143 is threadedly mounted on the projecting end of the rod 141 and bears against the bracket 142. A spring 144 surrounds the rod 141 intermediate the bracket 142 and the U-channel so that a pressure is exerted on the member 140 against the vertical member 133. An L-shaped bracket 145 has one leg pivotally fastened to the side of the member 140 intermediate its ends. The other leg has an opening through which the "Transitorq" rod 146 passes in sliding engagement. Two springs 148 surround the rod 146 one on each side of the bracket 145 and act between the bracket 145 and stops 147 secured to either end portion of the rod 146. The springs provide a resilient connection that will permit movement of the bracket 145 through a greater range than the rod 146. It will be seen that any change in the position of the vertical member 133 caused by raising or lowering the cutting head A will be transmitted to the "Transitorq" rod 146 which will regulate the speed change mechanism and cause the speed of the transmission to increase or decrease dependent upon the position of said rod. Although a variable speed transmission has been employed, it will be evident that other speed-controlling means may be substituted such as, for example, a rheostat suitably connected to the motor F and operated by the rod 146.

Referring particularly to Fig. 5, the bar W to be cut is shown preferably supported on a roller conveyor or roll table T having spool-shaped rollers 150 carried by axles 152 journalled in supporting bearings 151. The rollers 150 are preferably power driven by an electric motor 153 connected to the axle 152 through a speed-reduction gearing 154. The motor 153 is preferably on the side of the table T opposite the head A. In this figure the blowpipe head A is shown in the position assumed when the cut is nearly completed, but before the limit lever 22 has escaped the work and before the head is raised for the return movement.

The electrical circuits and operation of the various electrical units will be described in relation to the general operation of the apparatus which, referring to Figs. 1 to 7, is as follows:

Assuming that the upper frame S is in its retracted position and a round bar W which it is desired to cut is suitably supported on the roll table T in front of the apparatus, the vertical position of the head A and blowpipe 21 in relation to the bar W is adjusted by means of the handscrew mechanism M. The operator depresses the starting push button 400, Fig. 7, which energizes a contactor coil 401 of a standard motor-starting control which may be provided with a pilot or signal light, 401' through the circuit; line $L_1$, a pair of contacts 401b, and line $L_2$. Energizing contactor coil 401 closes the circuit of the normally open pair of contacts 401b and completes a circuit from line $L_1$, contacts 401b, motor F, to line $L_2$. Energizing the contactor 401 also closes the circuit of a normally open pair of contacts, 401a which shunt the push button contacts 400 thus holding the relay coil 401 in the energized condition through the circuit from $L_1$, contacts 401a, which are now closed, coil 401 to $L_2$. The starting of motor F causes the threaded drive shaft E (Fig. 1), and the worm gears 49 (Fig. 4), which are meshed with said drive shaft, to revolve.

To start the forward motion of the plate 20 the operator next depresses the push button 402 which energizes relay 403 through the circuit; line $L_1$, contact 401a which is now closed, button 402, relay 403 to line $L_2$. This closes normally open relay contacts 403a, 403b, 403d, and opens normally closed contacts 403c. Closing contacts 403d energizes contactor coil 404 through the circuit; line $L_1$, contacts 403d, normally closed contacts 405a, and 407a of relays 405, and 407, respectively, contactor coil 404, to line $L_2$. The contacts 404a close when contactor coil 404 is energized and complete the circuit for actuating the solenoid valve 27' to open the conduit 31 (Fig. 1), which causes air to enter the head end of the cylinder C, thus forcing the rod 29 out and imparting a forward motion to the plate 20 and therefore to the upper frame S.

This forward motion causes the cam 68 (Fig. 2), to release the arm 67 allowing the normally open limit switch 39 to close, and continues until the limit lever 22, of head A (Fig. 1), contacts the surface of the bar W. Angular displacement of the lever 22 by contact with the bar W acting as a contact device moves the cam 126 to engage and close the normally open limit switch 42. Closing the limit switch 42 energizes relay 405 through the circuit; line $L_1$, closed contacts 403b, limit switch 42, normally closed contacts 407b of relay 407, and relay 405 to line $L_2$. Energizing relay 405 closes normally open contacts 405b, 405c, and opens normally closed contacts 405a. Opening normally closed contacts 405a de-energizes contactor coil 404 thereby de-energizing solenoid volve 27' which now closes off conduit 31 to interrupt the air supply to the head end of cylinder C. Simultaneously, the coil of solenoid valve 35 is energized through the circuit; line $L_1$, closed contacts 405b, the coil of the solenoid valve 35 to line $L_2$. The opening of the solenoid valve 35 causes air to flow into the upper portions of cylinders J and J' which lowers levers 56 and thus actuates the friction-clutch mechanism H to stop the rotation of the worm gears 33 and 34. The worm gears now act as a stationary nut meshing with the threaded drive shaft E so that the revolution of the drive shaft E now continues the forward motion of the plate 20 at a regulated speed. Closing the limit switch 42 also energizes relay 406 through the circuit; line $L_1$, closed contacts 403b, closed contacts 405c, relay 406, to line $L_2$. Energizing relay 406 closes normally open contacts 406a, 406b, and 406c. This actuates the motor-operated valve 24 through the circuit; line $L_1$, a fixed resistance, contacts 406a, limit switch 413, motor-operated valve 24, contacts 406b, to line $L_2$, and supplies the preheating gases to the blowpipe 21. The motor valve 24 operates two limit switches 413 and 414 (Fig. 7), provided so that the motor controlling said valve is automatically de-energized by the opening of switch 413 (by the motor of the value 24) after the preheat gases have been turned on. The oxidizing and fuel gases flow from the valve 24 through conduits 155 and 156 along the boom R to the blowpipe 21 and are ignited when they issue from the nozzle of the blowpipe. The preheating gases may be ignited by providing a pilot flame, however, when cutting hot metal the heat of the metal may be sufficient to effect ignition. The conduits may be secured by a bracket 157 to the side of the boom. It is assumed that the bar W is at a sufficient temperature to ignite the preheat gases.

The forward motion of the plate 20 continues and causes the limit lever 22 to be further depressed which causes the cam 125 to engage and close the limit switch 41 at the instant that the blowpipe 21 reaches the starting position at the side of the bar W. Closing limit switch 41 energizes relay 407 through the circuit; line $L_1$, closed contacts 430b, limit switch 41, and relay 407, to line $L_2$. Energizing relay 407 opens normally closed contacts 407a, 407b, 407d, and closes normally open contacts 407c. Opening contacts 407b deenergizes the relay 405 and opens contacts 405c but this does not deenergize relay 406 because contacts 406e are held closed by relay 406. Opening contacts 407d de-energizes a time delay relay coil 410 which relay coil after a time delay opens contacts 412 to deenergize a second time delay relay coil 411 which after a time delay closes its normally closed contacts 416. The de-energizing of relay 405 causes the clutches P and P' to disengage, stopping the slide and thus permitting a portion of the side surface of the bar W to be heated to the ignition temperature for a predetermined period before the actual cutting operation commences. At the completion of the preheat cycle the time delay means operates and the relay 408 is energized through the circuit line $L_1$, closed contacts 403d, contacts 416 of the time delay means, relay 408 to line $L_2$, the contacts 416 being closed by the operation of the relay 411. Energizing relay 408 closes the normally open contacts 408a, 408b. Closing contacts 408b energizes the coil of the solenoid valve 25 controlling the cutting oxygen and causes said gas to flow to the blowpipe 21 through a conduit 158. Closing contacts 408a causes the solenoid valve coil 405 to be again energized through the circuit $L_1$, contacts 408a, coil 405, to line $L_2$ thus engaging clutches P and P'. The oxygen stream reacts thermochemically with the metal to produce a kerf in its progress over the bar.

As the forward motion of the plate 20 continues, the cutting blowpipe 21 starts to travel across the bar W, the rollers 23 climbing up the surface to raise the forward extremity of the boom R, which reaches its highest level when the blowpipe is over the center of the bar W. This vertical motion of the boom R is arranged to actuate the speed-control unit K so that the threaded drive shaft E now controlling the forward motion of the boom R revolves at a slower rate of speed inversely proportionate as the thickness of the bar W increases during the cutting up to the middle of the cut. When the boom R starts to move upward as it travels over the bar, the normally open limit switch 38 will be closed. Switch 37 in parallel with switch 38 has normally closed contacts, which contacts will open by disengagement of cam 68 with switch arm 66 when the boom has moved forward to a point where the blowpipe 21 is approximately over the vertical centerline of the bar. Upon descending the reverse slope of the bar and finishing the cut, the limit switch 38 will be opened, thereby de-energizing relay 403 and initiating the return of the boom to the normal retracted position. Thus the automatic retraction of the machine to the starting position is initiated by the forward and vertical motions of the boom R.

De-energizing relay 403 also de-energizes relays 406 and 408 by re-opening contacts 403b and 403d, respectively. De-energizing relay 408 re-opens normally open contacts 408a and 408b. Opening the latter contacts de-energizes the coil of the solenoid valve 25 controlling the flow of cutting oxygen thereby interrupting the flow of said gas to the blowpipe 21. De-energizing relay 406 causes the normally closed contacts 406c and 406d to reclose thereby again energizing the motor which controls the motor-operated valve 24 through the circuit; line L₁, contacts 406c, motor-operated valve 24, limit switch 414, and contacts 406d to line L₂. Actuating said valve interrupts the flow of preheat gas to the blowpipe 21. De-energization of the motor controlling said valve is automatically accomplished by the limit switch 414 which is actuated by said motor.

De-energizing relay 403 also recloses normally closed contacts 403c thus energizing the coil of the boom lifting solenoid valve 40 which opens so that air flows into the air cylinder L thereby raising the cutting head A to a point slightly higher than the highest point of the bar W. Simultaneously, air is released from the clutch-controlling air cylinders J and J', due to the fact that the normally open contacts 405b have been reopened by de-energization of relay 405, thereby de-energizing the coil of the solenoid valve 35. Release of air from the cylinders J and J' permits worm gears 33 and 34 to revolve freely. At the same time that the solenoid valve 35 is de-energized, air is caused to enter the rod end of the air cylinder C through the conduit 32 thereby causing the upper frame S to retract. Entrance of air into cylinder C is caused by energization of a contactor coil 415 which closes the contacts 415a and energizes the coil of the solenoid valve 27''. The circuit to energize the contactor coil 415 is: line L₁, limit switch 39, which is closed when the boom R is in its forward position, closed contacts 403c, contactor coil 415, line L₂.

The plate 20 and the boom R retract until the limit switch 39 is opened by engagement of the cam 68 with switch arm 67. Opening said switch de-energizes the contactor coil 415 and also the coil of the boom lifting solenoid valve 40 thereby interrupting the flow of air to both air cylinders C and L. This completes the cycle of operation and lowers the cutting head A to its original starting position.

Although the operation of the apparatus has been described with respect to the cutting of round stock, other elongated shapes may also be cut. For example, by supporting a length of square bar stock on one of its corners so that an upwardly sloping face is presented to the cutting blowpipe, forward motion of the boom will, during the cutting operation, carry the blowpipe up that face and down the adjacent face, thereby severing the bar. In cutting bar stock of polygonal cross-section such as hexagonal, the stock may be supported on any of its faces.

Another embodiment of the invention, shown in Figs. 8 and 9, may comprise a base frame B', and a boom R' pivoted at 199 on a carriage D which is movable longitudinally with respect to the base B'. The movable carriage D is provided with four flanged rollers 200, which guide said carriage on upper or lower tracks 201 and 202, respectively, fastened longitudinally to the upper portion of the base B'. The forward extremity of the boom R' supports a cutting head A' which comprises a blowpipe 203, means for adjusting and holding the blowpipe in a fixed position with respect to the boom, and means for guiding the blowpipe over the work to be cut. Means for adjusting and holding the blowpipe 203 preferably includes a blowpipe holder 204 having arcuate ways that slidably engage the upper and lower arcuate edges of a torch slide 205, and which is held in the desired adjusted position by means of a clamp 206. A skid or a roller 207 may be provided to guide the blowpipe. The roller 207 is carried at the lower end of a downwardly and forwardly projecting leg 208 secured to the end of the boom. The opposite end of the boom R' is provided with a counterweight 209.

Motion may be imparted to the carriage D by means of a threaded drive shaft E' rotatably mounted in bearings 210 secured to the base B' between the tracks 201 and 202 and actuated through a suitable gear mechanism Y including a speed-reduction gear 211, by a motor 212. The threaded drive shaft E' engages a half-nut clutch 213 mounted on the end of and actuated by a lever 214 pivotally secured on the carriage D. The half-nut is held disengaged by a spring catch 218.

If desired, the operation of the apparatus may be completely manual. This is accomplished by providing a pinion gear 215 rotatably mounted on the carriage D and adapted to engage a rack 216 secured to the upper edge of the track 202. The pinion 215 is rotated by a handwheel 217 secured to the pinion shaft. Obviously the clutch 213 is disengaged when the carriage is to be moved manually by turning handwheel 217. In the particular embodiment of the invention herein described, the preheating gases are ignited as the blowpipe approaches the hot billet. After a short pause to permit a small portion of the side of the billet to become preheated to ignition temperature, the valve controlling the cutting oxygen is opened and at the same time, motion is imparted to the carriage D causing the blowpipe 203 to traverse the work. At the completion of the cut, the blowpipe may be returned to its original position by retracting the carriage D. The work to be cut may be supported on a suitable extension of the base B' or it may be supported independently such as by a roller table arrangement T described in connection with Fig. 5.

In the embodiment of the invention shown in Figs. 8 to 10, the speed of traverse may be uniform, the speed selected being that which is adapted to cut through the thickest portion of the work. In all embodiments, and particularly that illustrated in Figs. 1 to 6, inclusive, the length of the boom between the blowpipe and the boom pivot is sufficient so that the angular rocking of blowpipe during cutting is not excessive when cutting stock of similar width and thickness such as rounds. This dimension and the height of the work axis above the boom pivot level are so selected that the blowpipe axis rocks through a desired angular motion during the cut, that is, during the first half of the cut the angle change is such that the lower part of the stream tends to be moved faster than the upper part and during the latter part of the cut the reverse occurs. This is beneficial because the early part of the kerf is through thinner material and the angle change causes the jet to sweep into the thicker portions more quickly. During cutting of the thick part, a cutting lag accumulates and during the last part of the cut the blowpipe movement is slower and the angle change is relatively small so that the accumulated lag is accommodated by slowing the traverse of the lower part of the jet. With a given size nozzle and oxygen consumption rate, a quicker cut can be accomplished by this method as compared to the prior art method whereby the torch is maintained constantly parallel to its successive positions during the cut.

The invention is not limited to the exact details disclosed and it will be seen that certain features of the invention may be used independently of others and changes may be made in various features of the apparatus without departing from the essentials of the invention.

We claim:

1. In a machine for cutting elongated metal stock of substantially regular cross section, the combination of a gas-cutting blowpipe; means, including a member extending transversely to said stock, for supporting said blowpipe in an operating position at one end thereof, said blowpipe being held at a substantially fixed angular relation to said member during a cutting operation, means including a movable carriage pivotally secured to said member at a distance from said blowpipe greater than the length of cutting stroke thereof for imparting transverse motion to said member with respect to said stock; said pivotal connection providing movement of said member about an axis substantially parallel to the longitudinal axis of said stock during said transverse motion; and a stock rider carried by the end portion of said member adjacent said blowpipe for maintaining said blowpipe at a predetermined distance from said stock during such motion being cammed by the regular cross section of the stock to swing said member about said pivotal connection.

2. Machine for cutting elongated metal stock comprising in combination a base adapted to be mounted at one side of said stock; a carriage movable longitudinally with respect to said base for transverse movement with respect to said stock; a boom pivotally attached to said carriage and extending upwardly therefrom and inclined toward said stock and having a portion adapted to extend over said stock for movement about an axis substantially parallel to the longitudinal axis of said stock; a support secured to said extending portion of said boom for supporting a gas-cutting blowpipe; means for supporting said boom in an operating position with respect to said stock; power-actuated mechanism for imparting a longitudinal motion to said carriage; and a stock rider for maintaining said blowpipe at a predetermined distance from said stock during the forward motion of said blowpipe.

3. Machine for cutting elongated metal stock comprising in combination a base; a carriage movably mounted on said base for transverse movement with respect to said stock; a member mounted on said carriage and having a portion adapted to extend therefrom over said stock; a gas cutting blowpipe carried by said extending portion of said member, stock engaging means for maintaining said blowpipe at a predetermined distance from said stock; means including a drive for imparting motion to said carriage; and automatic means actuated by said stock engaging means and responsive to the thickness of the stock for controlling the rate of movement of said carriage.

4. Machine for cutting elongated metal stock comprising in combination a cutting blowpipe; means including a plurality of valves for controlling the flow of gases to said blowpipe; means for actuating said valves in predetermined sequence; mechanism for supporting said blowpipe for movement transversely to said stock for a cutting stroke to form a kerf therethrough, means for imparting transverse motion to said blowpipe mechanism for movement toward said stock into operative position with respect to said stock, and means responsive to arrival of said blowpipe mechanism into said operative position for starting said means for actuating said valves in predetermined sequence.

5. In a machine for thermochemically cutting elongated metal stock, the combination of a cutting blowpipe; a carriage laterally movable with respect to said stock; an arm pivotally connected to said carriage for movement about an axis substantially parallel to a longitudinal axis of said stock, said arm extending transversely of said stock and having an end portion adapted to move over said stock; means for securing said blowpipe to said end portion of the arm; and means for maintaining said blowpipe at a substantially constant distance above the surface of said stock during the cutting operation, the axis of the pivot connection of said arm to said carriage being below the level of the longitudinal axis of said stock, and the distance between said pivot connection and said blowpipe being such that the blowpipe is caused to assume successively different angular positions.

6. A machine for thermochemically severing elongated metal stock, comprising in combination, a blowpipe, mechanism for supporting said blowpipe for movement transversely to said stock for a cutting stroke to form a kerf therethrough, a power-actuated driving device for propelling said blowpipe mechanism toward said stock into operative position and away from said stock into inoperative position, and a control device responsive to arrival of said blowpipe mechanism into operative position for cutting off the supply of power to said blowpipe mechanism propelling device.

7. A machine for thermochemically severing elongated metal stock, comprising in combination, a blowpipe power-actuated mechanism for propelling said blowpipe transversely to said stock for a cutting stroke to form a kerf therethrough, a support for supporting said blowpipe mechanism for movement toward said stock into operative position and away from said stock into inoperative position, and a control device responsive to arrival of said blowpipe mechanism into operative position for turning on the supply of power to said propelling mechanism and thereby starting said cutting stroke.

8. A machine for thermochemically severing elongated metal stock, comprising in combination, a blowpipe, a valve for controlling the supply of pre-heat gas to said blowpipe, a valve for controlling the supply of cutting oxygen to said blowpipe, mechanism for supporting said blowpipe for movement transversely to said stock for a cutting stroke to form a kerf therethrough, a frame and relatively movable parts thereon for supporting said blowpipe mechanism for movement toward said stock into operative position and away from said stock into inoperative position, and a control device responsive to arrival of said blowpipe mechanism into operative position for controlling the operation of said valves to open said pre-heat gas valve for a time delay period and thereafter open said cutting oxygen valve.

9. A machine for thermochemically severing elongated metal stock, comprising in combination, a blowpipe, mechanism for supporting said blowpipe for movement transversely to said stock for a cutting stroke to form a kerf therethrough, a frame and relatively movable parts thereon for supporting said blowpipe mechanism for movement toward said stock into operative position and away from said stock into inoperative position, power-actuated driving devices for propelling said blowpipe and said mechanism for said movement, and a control device responsive to arrival of said blowpipe mechanism into said operative position for cutting off the supply of power to said driving device for stopping said movement toward the stock and turning on the supply of power to the driving device for starting the cutting stroke.

10. In a machine for thermochemically cutting elongated metal stock the combination of a cutting blowpipe; a carriage laterally movable with respect to said stock; means on said carriage for supporting said blowpipe; means for maintaining said blowpipe at a substantially constant distance above the surface of said stock during the cutting operation; mechanism including a device engageable with the surface of said metal stock, constructed and arranged for controlling the lateral movement of said carriage to stop advancement of said blowpipe toward the stock when the blowpipe reaches the initial operating position, and to initiate the movement of the blowpipe across the stock at cutting speed.

11. A machine for thermochemically cutting elongated metal stock comprising a cutting blowpipe; a base having horizontal ways disposed transversely to the length of said stock; a carriage movable along said ways; a blowpipe head, means for mounting said blowpipe head on said carriage, means for maintaining said blowpipe at a substantially constant distance from the surface of said stock during the cutting operation; means for rapidly moving said carriage to quickly advance said blowpipe head toward said stock; means operable to advance said blowpipe at a controlled rate during the cutting operation; and mechanism having a portion engaging the surface of said stock for stopping said rapid advance, and for actuating said means for starting the cutting operation movement.

12. Method of cutting sections of bar stock which comprises heating at least a portion of said stock to ignition temperature; directing a jet of oxidizing gas from a nozzle against said heated portion of said stock to form a kerf therethrough; moving said jet completely across said stock and in a plane transverse thereto; and during such transverse movement varying the angle between the successive positions of the axis of said jet and the initial position of said axis at a variable rate by swinging said nozzle about a pivotal axis substantially parallel to the longitudinal axis of the stock and spaced from the nozzle tip a greater distance than the length of the cutting stroke while moving said pivotal axis in the direction of cutting, said angle variation being substantially greater during the first half of the cut and in such direction that the jet tends to sweep along the lower portion of the kerf at a faster rate than along the upper portion of the kerf.

13. Method of cutting sections of bar stock which comprises heating at least a portion of said stock to ignition temperature; directing a jet of oxidizing gas from a nozzle against said heated portion of said stock to form a kerf therethrough; moving said jet completely across said stock and in a plane transverse thereto by swinging said nozzle about a pivotal axis substantially parallel to the longitudinal axis of the stock and spaced from the nozzle tip a greater distance than the length of the cutting stroke while moving said pivotal axis in the direction of cutting; and during such transverse movement varying the speed of movement of the jet such that the last portion of the kerf is traversed at a substantially slower speed than the first portion of the kerf whereby the effect of accumulated cutting lag is accommodated.

14. Method of cutting sections of bar stock which comprises heating at least a portion of said stock to ignition temperature; directing a jet of oxidizing gas from a nozzle against said heated portion of said stock to form a kerf therethrough; moving said jet completely across said stock and in a plane transverse thereto; and during such transverse movement varying the angle between the successive positions of the axis of said jet and the initial position of said axis at a variable rate by swinging said nozzle about a pivotal axis substantially parallel to the longitudinal axis of the stock and spaced from the nozzle tip a greater distance than the length of the cutting stroke while moving said pivotal axis in the direction of cutting, said angle variation being substantially greater during the cutting of the first half of the kerf and in such direction that the emergent portion of the jet tends to sweep along the lower portion of the kerf at a faster rate than the entrant portion of said jet sweeps along the upper portion of the kerf; and varying the speed of transverse movement of the jet such that the last portion of the kerf is traversed at a substantially slower speed than the first portion of the kerf whereby the effect of accumulated cutting lag is accommodated.

15. Method of cutting sections of bar stock of such cross-section that the thickness to be penetrated is less at the beginning and at the end of the cut than at the intermediate portion of the cut, which comprises heating at least a portion of said stock to ignition temperature; directing a jet of oxidizing gas from a nozzle against said heated portion of said stock to form a kerf therethrough; moving said jet completely across said stock and in a plane transverse thereto; during such transverse movement varying the angle between the successive positions of the axis of said jet and the initial position of said axis at a variable rate by swinging said nozzle about a pivotal axis substantially parallel to the longitudinal axis of the stock and spaced from the nozzle tip a greater distance than the length of the cutting stroke while moving said pivotal axis in the direction of cutting, said angle variation being substantially greater during the cutting of the first half of the kerf and in such direction that the jet tends to sweep along the lower portion of the kerf at a faster rate than along the upper portion of the kerf; and varying the speed of transverse movement of said jet by varying the speed of said pivotal axis along said line substantially in inverse proportion to the depth of the kerf being cut.

16. In a machine for cutting elongated metal stock, the combination of a gas-cutting blowpipe; a carriage movable laterally with respect to said stock; means, including a member secured to said carriage for supporting said blowpipe; means for propelling said carriage; means for maintaining said blowpipe at a predetermined distance from the surface of said stock during the cutting operation; and automatic means operable by vertical movement of said blowpipe for varying the rate of transverse and vertical motion of said blowpipe during the operating cycle of said machine.

17. In a machine for cutting elongated metal stock, the combination of a gas-cutting blowpipe; a carriage movable laterally with respect to said stock; a member secured to said carriage for supporting said blowpipe; power-actuated mechanism for propelling said carriage; a stock rider for maintaining said blowpipe at a predetermined distance from the surface of said stock during the cutting operation; and a control device operable by downward movement of said member after movement of said blowpipe for a predetermined distance across said stock for automatically reversing the direction of travel of said carriage at the completion of the cut.

18. In a machine for cutting elongated metal stock, the combination of a gas-cutting blowpipe; a carriage movable laterally with respect to said stock; means, including a member secured to said carriage for supporting said blowpipe; means for propelling said carriage and including means operable by movement of said blowpipe for automatically varying the rate of movement of said carriage inversely with respect to the thickness of the stock being cut; and means for maintaining said blowpipe at a predetermined distance from said stock.

19. In a machine for cutting elongated metal stock, the combination of a gas-cutting blowpipe; a carriage movable laterally with respect to said stock; means, including a member adjustably secured to said carriage for supporting said blowpipe, said blowpipe being positioned adjacent one end of said member and in an operating position with respect to a surface of said stock; means for propelling said carriage, said propelling means including fluid-operated means for rapidly moving said carriage to advance said blowpipe toward said stock and into position for initiating the cut, motor-operated means for continuing the advance at a relatively slower regulated speed until the cut is completed, and means for causing said fluid-operated means to retract said carriage at a relatively high speed and return the blowpipe to its original position; and means for maintaining said blowpipe at a predetermined distance from said stock.

20. In a machine for thermochemically cutting elongated metal stock the combination of a cutting blowpipe; a carriage laterally movable with respect to said stock; means on said carriage for supporting said blowpipe; a stationary base having ways for movably supporting said carriage; a motor-driven rotatable feed screw journaled on said carriage and extending transversely of said metal stock; means on said base and cooperating with said feed screw operable to control the movement of said carriage responsive to the rotation of said feed screw; mechanism for regulating the rate of rotation of said feed screw comprising a rockable arm pivotally connected to said carriage; a device adapted to engage the surface of the stock and responsive to the thickness thereof for controlling the speed of said motor and the rate of rotation of said feed screw; and means connecting said rockable arm to said speed-controlling device.

21. In a machine for cutting elongated metal stock, the combination of a gas-cutting blowpipe; a carriage movable laterally with respect to said stock; means for holding said blowpipe on said carriage in an operating position for movement across said stock; means for propelling said carriage in either direction transversely of said stock; work contacting means associated with said blowpipe holding means for engagement with said stock, said contacting means being arranged for progressive displacement with respect to said blowpipe during movement of said blowpipe across said stock; and means operable by said contacting means for automatically adjusting the rate of travel of said carriage.

22. Apparatus for thermochemically cutting metal stock, comprising ways disposed transversely with respect to said stock; a motor-driven carriage movable along said ways at a predetermined speed; an arm rockably supported on said carriage, said arm having a portion adapted to be positioned over a surface of said stock and being angularly displaceable in a plane transverse to said stock; a cutting blowpipe carried by said arm in an operating position with respect to said surface; means associated with said blowpipe for adjusting the position of said arm to maintain the blowpipe at a substantially constant distance from said surface during the cutting operation; automatic means for stopping and starting the movement of said carriage along said ways; and means on said arm for operating said stopping and starting means at a desired position in the course of movement of said carriage and said blowpipe with respect to said stock.

23. Apparatus for thermochemically cutting metal stock, comprising ways disposed transversely with respect to said stock; a motor-driven carriage movable along said ways; adjustable means associated with said motor for regulating the speed of movement of said carriage; a boom rockably supported on said carriage, said boom having an arm portion extending toward said stock, said arm being angularly displaceable in a plane transverse to said stock; a cutting blowpipe carried by said arm in an operating position with respect to a surface of said stock; means associated with said blowpipe for adjusting the position of said arm and maintaining the blowpipe at a substantially constant distance from said surface during the cutting operation; and mechanism connected between said boom and said carriage for adjusting said speed-regulating means to vary the speed of said carriage according to the angular position of said arm portion of the boom.

24. Apparatus for cutting metal stock according to claim 23 in which said speed adjusting mechanism comprises lever means pivoted on said carriage, said lever having a portion operatively connected to said speed-regulating means; and adjustable means acting between said lever and said boom for adjusting the amount of movement of said lever means according to a given angular displacement of said boom whereby a desired degree of response of said speed-regulating means may be selected.

25. Apparatus for cutting sections of bar stock which comprises a source of heat for heating at least a portion of said stock to ignition temperature; a nozzle for directing a jet of oxidizing gas against said heated portion of said stock to form a kerf therethrough; said nozzle being mounted on a pivotal axis substantially parallel to the longitudinal axis of the stock and spaced from the nozzle tip to a distance greater than the length of the cutting stroke, a power device for moving said nozzle and its pivot completely across said stock and in a plane transverse thereto; and mechanism connected to said nozzle for varying, during such movement, the angle between the successive positions of the axis of the jet outlet of said nozzle and the initial position of said axis at a variable rate, said angle variation being substantially greater during the first half of the cut and in such direction that the jet tends to sweep along the lower portion of the kerf at a faster rate than along the upper portion of the kerf.

26. Apparatus for cutting sections of bar stock which comprises a source of heat for heating at least a portion of said stock to ignition temperature; a nozzle for directing a jet of oxidizing gas against said heated portion of said stock to form a kerf therethrough; a power device for moving said nozzle completely across said stock and in a plane transverse thereto; and linkage connected to said nozzle for varying, during such movement including a pivot spaced from the nozzle tip a distance greater than the length of the cutting stroke and about which the nozzle swings and which pivot is moved by said power device, the speed of movement of the nozzle such that the last formed portion of the kerf cut by said jet is traversed at a substantially slower speed than the substantially inversely proportional speed of the first formed portion of the kerf whereby the effect of accumulated lag is accommodated.

27. Apparatus for cutting sections of bar stock which comprises means for heating at least a portion of said stock to ignition temperature; a nozzle for directing a jet of oxidizing gas against said heated portion of said stock to form a kerf therethrough; said nozzle being mounted on a pivotal axis substantially parallel to the longitudinal axis of the stock; a power device for moving said nozzle completely across said stock and in a plane transverse thereto; and connections between said nozzle and said power device including a pivot spaced from the nozzle tip a distance greater than the length of the cutting stroke and about which the nozzle swings and which pivot is moved by said power device for varying, during such movement, the angle between the successive positions of the axis of the jet outlet of said nozzle and the initial position of said axis at a variable rate, said angle variation being substantially greater during the cutting of the first half of the kerf and in such direction that the emergent portion of the jet tends to sweep along the lower portion of the kerf at a faster rate than the entrant portion of said jet sweeps along the upper portion of the kerf; and said connections serving for varying the speed of movement of the nozzle such that the last formed portion of the kerf is traversed at a substantially slower speed than the first formed portion of the kerf whereby the effect of accumulated cutting lag is accommodated.

28. Apparatus for cutting sections of bar stock which comprises a source of heat for heating at least a portion of said stock to ignition temperature; a nozzle for directing a jet of oxidizing gas against said heated portion of said stock to form a kerf therethrough; a power device for moving said nozzle completely across said stock and in a plane transverse thereto; and connections between said nozzle and said power device for varying, during such movement, the angle between the successive positions of the axis of the jet outlet of said nozzle and the initial position of said axis at a variable rate, said angle variation being substantially greater during the cutting of the first half of the kerf and in such direction that the jet tends to sweep along the lower portion of the kerf at a faster rate than along the upper portion of the kerf; and a speed control for said power device for varying the speed of transverse movement of said jet substantially in inverse proportion to the depth of the kerf being cut.

29. A machine for cutting elongated metal stock comprising in combination a track extending transversely to said stock, a carriage movable along said track, a blowpipe, mechanism on said carriage for supporting said blowpipe, an abutment on said carriage, a power device for moving said carriage toward said stock to bring said abutment into engagement with the side of said stock and to position said blowpipe to start a cut, and a power device on said carriage for causing said blowpipe supporting mechanism to move beyond said starting position and along a projected line of cut.

30. A machine for supporting and propelling a blowpipe across an elongated metal body, which comprises the combination of a base adapted to be mounted adjacent one side of said body, a boom extending transversely of said body, means for mounting said boom on said base for movement toward and away from said body, blowpipe mechanism on said boom for supporting the blowpipe for movement across said body, all of the parts being so arranged that said blowpipe mechanism may be moved downwardly toward said stock into operative position and upwardly away from said stock into inoperative position, power actuated means for driving said blowpipe across the metal body, and power actuated means for returning said blowpipe into inoperative position at a faster rate than the forward stroke of the blowpipe.

31. A machine for supporting and propelling a blowpipe across an elongated metal body, which comprises the combination of a base adapted to be mounted adjacent one side of said body, a boom extending upwardly from said base and transversely of said body, means for mounting said boom on said base for movement toward and away from said body, power-actuated means for driving said boom to cause said movement, blowpipe mechanism on said boom for supporting the blowpipe for movement across said body, all of the parts being so arranged that said blowpipe mechanism may be moved downwardly toward said stock into operative position and upwardly away from said stock into inoperative position.

32. A machine for supporting and propelling a blowpipe across an elongated metal body, which comprises the combination of a base adapted to be mounted adjacent one side of said body, a boom extending transversely of said body, means for mounting said boom on said base for movement toward and away from said body, blowpipe mechanism on said boom for supporting the blowpipe for movement across said body, all of the parts being so arranged that said blowpipe mechanism may be moved downwardly toward said stock into operative position and upwardly away from said stock into inoperative position, power actuated means for so moving said blowpipe mechanism, power actuated means for driving said blowpipe mechanism for the forward stroke of the blowpipe across the metal body, and power actuated means for rapidly retracting said blowpipe into inoperative position at a faster rate than said forward stroke thereof.

33. A machine for supporting and propelling a blowpipe relative to an elongated metal body, which comprises the combination of a base adapted to be mounted adjacent one side of said body, a track mounted on said base extending transversely with respect to said body; a carriage mounted on said track for movement toward and away from said body, blowpipe mechanism mounted on said carriage for supporting the blowpipe for movement relative to said body for an operative stroke, an abutment on said carriage, all of said parts being so arranged that said carriage can be moved along said track to move said blowpipe mechanism forwardly until said abutment engages said body to locate said blowpipe mechanism in operative position adjacent said body and rearwardly into inoperative position spaced away from said body, and said blowpipe mechanism may be operated to move the blowpipe relative to said body when said blowpipe mechanism is in said operative position.

34. A machine for supporting and propelling a blowpipe relative to a metal body, which comprises the combination of a base adapted to be mounted adjacent one side of said body, a track mounted on said base extending in a substantially horizontal plane below the upper surface of said body, a carriage mounted on said track for movement toward and away from said body, blowpipe mechanism mounted on said carriage for supporting the blowpipe for movement transversely of said body, power actuated means for driving said carriage and said blowpipe mechanism, a surface rider associated with said blowpipe mechanism and said carriage adapted to engage said body whereby said blowpipe is maintained in spaced relation to said body during such transverse movement of the blowpipe, and a power device for moving said carriage, blowpipe mechanism and blowpipe into a non-operating position at a faster rate than the forward stroke of the blowpipe.

35. A method of thermochemically severing rectangular stock by a jet of oxidizing gas moved transversely across the surface of said stock, the portions of said surface against which said jet is applied being at ignition temperature, such method including the steps of first directing said jet to contact a corner of said stock to start the cut, then sweeping said jet in a transverse plane across said surface at a rate sufficient to produce a substantial cutting lag, and during a portion of said movement, controlling the angle of inclination between the axis of said jet and said surface to provide a downward and forward inclination of the entrant portion of said jet by swinging said jet about a pivotal axis substantially parallel to the longitudinal axis of the stock and spaced from the entrant portion of said jet a greater distance than the length of the cutting stroke while moving said pivotal axis in the direction of cutting, the rate of transverse movement being correlated with said downward and forward inclination of the entrant portion of said jet to compensate for said cutting lag and effect complete severance of the stock when said jet reaches the finishing end of the cut.

36. A machine for thermochemically severing elongated metal stock comprising in combination, a blowpipe, a valve for controlling the supply of one of the gases to said blowpipe, mechanism for supporting said blowpipe for movement transversely to said stock for a cutting stroke to form a kerf therethrough, means for supporting said blowpipe mechanism for movement toward said stock into operative position and away from said stock into inoperative position, and means responsive to arrival of said blowpipe mechanism into said operative position for controlling the operation of said valve.

37. A machine for thermochemically severing elongated metal stock comprising in combination, a blowpipe, a valve for controlling the supply of one of the gases to said blowpipe, mechanism for supporting said blowpipe for movement transversely to said stock for a cutting stroke to form a kerf therethrough, means for supporting said blowpipe mechanism for movement toward said stock into operative position and away from said stock into inoperative position, and means engageable with said stock when said mechanism moves into operative position for controlling the operation of said valve.

38. Apparatus for thermochemically severing rectangular stock by a jet of oxidizing gas moved transversely across the surface of said stock, the portions of said surface against which said jet is applied being at ignition temperature, such apparatus including a nozzle for directing said jet to contact a corner of said stock to start the cut, a power device for propelling said nozzle for sweeping said jet in a transverse plane across said surface at a rate sufficient to produce a substantial cutting lag, and connections to said nozzle including a pivot spaced from the nozzle tip a distance greater than the length of the cutting stroke and about which the nozzle swings and which pivot is moved by said power device and operating during a portion of said movement for controlling the angle of inclination between the axis of said jet and said surface to provide a downward and forward inclination of the entrant portion of said jet, the rate of movement being correlated with said downward and forward inclination of the entrant portion of the jet to compensate for such cutting lag and effect complete severance of the stock when said jet reaches the finishing end of the cut.

39. A machine for thermochemically severing bar stock by moving a blowpipe in a plane transverse to the neutral axis of said stock, which comprises means for advancing said blowpipe along a substantially horizontal line in said plane from a position away from said stock toward said stock into starting position, means actuated by arrival of said blowpipe at said starting position for turning on a supply of gas to said blowpipe for preheating said stock and starting a cut therein, means for further advancing said blowpipe in said plane at cutting speed along a line of cut in said stock, and means for maintaining said blowpipe spaced from said stock at all times during said advancing movements.

40. A machine for thermochemically severing bar stock by moving a blowpipe in a plane transverse to the neutral axis of said stock, which comprises means for rapidly advancing said blowpipe in said plane from a position away from said stock toward starting position of said blowpipe adjacent said stock, means for interrupting said rapid advance of said blowpipe at starting position to permit preheating of said stock and starting of a cut therein by said blowpipe, means actuated by said interrupting means for turning on a supply of gas to said blowpipe when said blowpipe is in starting position, and means for further advancing said blowpipe in said plane at cutting speed along a line of cut in said stock.

41. Method of thermochemically severing bar stock by moving a blowpipe in a plane transverse to the neutral axis of said stock, which comprises advancing said blowpipe along a substantially horizontal line in said plane from a position away from said stock toward said stock into starting position, turning on a supply of gas to said blowpipe in response to arrival thereof at said starting position for preheating said stock and starting a cut therein, further advancing said blowpipe in said plane at cutting speed along a line of cut in said stock by swinging said blowpipe about a pivotal axis substantially parallel to the longitudinal axis of the stock and spaced from the nozzle tip a distance greater than the length of the cutting stroke while moving said pivotal axis in the direction of cutting, and maintaining said blowpipe spaced from said stock at all times during said further advancing movements.

42. Method of thermochemically severing polygonal bar stock by moving a blowpipe in a plane transverse to the longitudinal axis of the stock, which comprises advancing said blowpipe along a substantially horizontal line in said plane from a position away from said stock toward said stock into starting position, turning on a supply of cutting oxygen to said blowpipe in response to arrival thereof at said starting position, directing the jet of cutting oxygen to contact a corner of said stock to start the cut, then sweeping said jet in said plane across said stock and during such transverse movement varying the angle between the successive positions of the axis of said jet and the initial position of said axis by swinging said blowpipe about a pivotal axis substantially parallel to the longitudinal axis of the stock and spaced from the nozzle tip of said blowpipe a distance greater than the length of the cutting stroke while moving said pivotal axis in the direction of cutting at a rate to produce a substantial cutting lag, and during the latter portion of said movement, controlling the angle of inclination between the axis of said jet and the surface of the stock to provide a downward and forward inclination of the entrant portion of the jet, the rate of transverse movement being correlated with said downward and forward inclination of the entrant portion of said jet to compensate for said cutting lag and effect complete severance of the stock when said jet reaches the finishing end of the cut.

HOMER W. JONES.
JAMES H. BUCKNAM.

REFERENCES CITED

The following references are of record in the file of this patent:

UNITED STATES PATENTS

| Number | Name | Date |
| --- | --- | --- |
| 857,247 | Menne | June 18, 1907 |
| 1,096,095 | Bucknam | May 12, 1914 |
| 1,345,242 | Reynolds | June 29, 1920 |
| 1,352,381 | Reynolds | Sept. 7, 1920 |
| 1,494,747 | Jenkins | May 20, 1924 |
| 1,520,494 | Drake | Dec. 23, 1924 |
| 1,546,128 | Haines | July 14, 1925 |
| 1,585,893 | Coberly | May 25, 1926 |
| 1,658,811 | Martini | Feb. 14, 1928 |
| 1,687,001 | Bishop | Oct. 9, 1928 |
| 1,691,007 | Crowe et al. | Nov. 6, 1928 |
| 1,694,567 | Stine | Dec. 11, 1928 |
| 1,729,207 | Coberly | Sept. 24, 1929 |
| 1,746,594 | Jacobson | Feb. 11, 1930 |
| 2,102,040 | Slade | Dec. 14, 1937 |
| 2,143,969 | Biggert | Jan. 17, 1939 |
| 2,177,276 | Bucknam | Oct. 24, 1939 |
| 2,182,120 | Graham | Dec. 5, 1939 |
| 2,184,562 | Rockefeller | Dec. 26, 1939 |
| 2,189,460 | Derhammer | Feb. 6, 1940 |
| 2,347,245 | Anderson | Apr. 25, 1944 |
| 2,347,804 | Anderson | May 2, 1944 |

FOREIGN PATENTS

| Number | Country | Date |
| --- | --- | --- |
| 513,715 | Germany | Dec. 1, 1930 |

OTHER REFERENCES

Welding Encyclopedia, 8th ed., pages 308 and 317–320, 1932.